(12) United States Patent
Kobayashi et al.

(10) Patent No.: US 9,764,697 B1
(45) Date of Patent: Sep. 19, 2017

(54) HEAT SHIELD FOR A MOTOR VEHICLE

(71) Applicant: Honda Motor Co., Ltd., Tokyo (JP)

(72) Inventors: Kazuhiro Kobayashi, Sakura (JP);
Hiroshi Kitamura, Dublin, OH (US);
Akihiko Koike, Dublin, OH (US);
Jonathan A Rihtar, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/074,849

(22) Filed: Mar. 18, 2016

(51) Int. Cl.
*B60R 13/04* (2006.01)
*B60R 13/08* (2006.01)
*B60K 13/04* (2006.01)
*B60K 15/03* (2006.01)

(52) U.S. Cl.
CPC ...... *B60R 13/0876* (2013.01); *B60R 13/0861* (2013.01); *B60K 13/04* (2013.01); *B60K 2015/03421* (2013.01)

(58) Field of Classification Search
CPC B60R 13/07; B62D 33/0273; B60K 13/0861; B60K 13/04
USPC .............................................. 296/39.3, 182.1
See application file for complete search history.

(56) References Cited

U.S. PATENT DOCUMENTS

| | | | | |
|---|---|---|---|---|
| 3,606,446 A * | 9/1971 | Leslie | ..................... | B60R 13/07 280/847 |
| 5,464,952 A | 11/1995 | Shah et al. | | |
| 5,813,491 A | 9/1998 | Sato et al. | | |
| 5,844,177 A | 12/1998 | Pirchl | | |
| 6,302,466 B1 | 10/2001 | Zwick | | |
| 6,663,171 B2 | 12/2003 | Hashirayama et al. | | |
| 7,383,912 B2 * | 6/2008 | Kondo | ................... | B60K 15/06 180/296 |
| 7,444,996 B2 * | 11/2008 | Potier | .................... | F02M 25/08 123/519 |
| 8,668,254 B2 | 3/2014 | Onodera et al. | | |
| 2002/0038737 A1 * | 4/2002 | Morishita | ................. | B60T 7/06 180/291 |

(Continued)

FOREIGN PATENT DOCUMENTS

| | | |
|---|---|---|
| AT | 187690 T | 1/2000 |
| AT | 383973 T | 2/2008 |

(Continued)

OTHER PUBLICATIONS

"Peugeot 106 Under Car Exhaust Heat Shield" http://www.106parts.com/engine-exhausts-heat-shields/pug-1723a2-106parts-sku-peugeot-106-under-car-exhaust-heat-shield-(long)-all-106-models-xsi-rallye-gti.html.

*Primary Examiner* — Pinel Romain
(74) *Attorney, Agent, or Firm* — Honda Patents & Technologies North America, LLC; Mark E. Duell

(57) ABSTRACT

A heat shield for a motor vehicle includes an elongated planar shield body for separating an exhaust pipe and a fuel tank of the motor vehicle, the shield body extending longitudinally along a longitudinal axis between the exhaust pipe and the fuel tank, the shield body having a generally concave surface extending from the axis to first and second vertical walls along first and second edges of the shield body, a forward attachment portion for attaching the shield body to a frame of the motor vehicle longitudinally forward of the fuel tank, a rearward attachment portion for attaching the shield body to the frame of the motor vehicle longitudinally rearward of the fuel tank, and a water escape port in the first vertical wall.

8 Claims, 5 Drawing Sheets

(56) References Cited

U.S. PATENT DOCUMENTS

| | | | |
|---|---|---|---|
| 2004/0083714 A1* | 5/2004 | Tsuruta | F01N 13/14 60/272 |
| 2006/0103171 A1 | 5/2006 | Blomeling et al. | |
| 2007/0037423 A1* | 2/2007 | Togawa | F16L 33/227 439/157 |
| 2010/0287919 A1 | 11/2010 | Yamagiwa et al. | |
| 2013/0026797 A1 | 1/2013 | Onodera et al. | |
| 2013/0062909 A1* | 3/2013 | Harris | B62D 33/0273 296/182.1 |
| 2013/0200656 A1 | 8/2013 | Shimmell et al. | |
| 2015/0158267 A1 | 6/2015 | Stuckey et al. | |

FOREIGN PATENT DOCUMENTS

| | | |
|---|---|---|
| CH | 692946 A5 | 12/2002 |
| CN | 102822041 A | 12/2012 |
| DE | 19508872 A1 | 9/1996 |
| DE | 19836970 A1 | 2/2000 |
| DE | 10349743 A1 | 6/2005 |
| EP | 0758960 B1 | 12/1999 |
| EP | 1062124 B1 | 12/2001 |
| EP | 1692011 B1 | 1/2008 |
| EP | 2522825 A1 | 11/2012 |
| EP | 2557022 B1 | 6/2014 |
| ES | 2168870 T3 | 6/2002 |
| ES | 2298805 T3 | 5/2008 |
| FR | 2781536 B1 | 10/2000 |
| FR | 2975130 A1 | 11/2012 |
| GB | 2376447 B | 5/2004 |
| TW | 552212 B | 9/2003 |
| WO | WO9628315 A1 | 9/1996 |
| WO | WO9946147 | 9/1999 |
| WO | WO2005049380 A1 | 6/2005 |
| WO | WO2011126086 A1 | 10/2011 |

\* cited by examiner

HEAT SHIELD FOR A MOTOR VEHICLE

TECHNICAL FIELD

The embodiments disclosed herein are related to the field of heat shields for motor vehicles. More particularly, the embodiments are related to heat shields that shield the fuel tank from the vehicle exhaust.

BACKGROUND

In order to protect the fuel tank of a motor vehicle from the heat of the exhaust pipe, a heat shield is typically mounted to the fuel tank and acts as a barrier between the exhaust pipe and the fuel tank.

The bottom of the motor vehicle, including the exhaust pipe, heat shield, and fuel tank, are exposed to water when the motor vehicle is driven during rain, snow, or otherwise is in wet conditions. In order to prevent deformation of the heat shield from water shock impact, which may be caused by splashed water hitting under-the-floor parts with a force great enough to deform the part and water damming, the heat shield typically included several mounting points. Additionally, in order to support the mounting points, the heat shield included portions of extra material strictly for mounting and without any shielding function. Additional ribs may also have been necessary to increase stiffness of the heat shield to prevent water shock impact deformation, which introduces complexity into the heat stamping process due to the complex shape of the heat shield. The heat shield was often larger than necessary, heavier than necessary, more expensive than necessary, and difficult to manufacture.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a heat shield for a motor vehicle includes an elongated planar shield body for separating an exhaust pipe and a fuel tank of the motor vehicle, the shield body extending longitudinally along a longitudinal axis between the exhaust pipe and the fuel tank, the shield body having a generally concave surface extending from the axis to first and second vertical walls along first and second edges of the shield body, a forward attachment portion for attaching the shield body to a frame of the motor vehicle longitudinally forward of the fuel tank, a rearward attachment portion for attaching the shield body to the frame of the motor vehicle longitudinally rearward of the fuel tank, and a water escape port in the first vertical wall.

According to another aspect, a motor vehicle includes a frame, a fuel tank attached to the frame by at least one tank band, an exhaust chamber attached to the frame, an exhaust silencer attached to the frame, an exhaust pipe extending between the exhaust chamber and the exhaust silencer, and a heat shield located between the exhaust pipe and the fuel tank. The heat shield further includes an elongated planar shield body for separating an exhaust pipe and the fuel tank, the shield body extending longitudinally along a longitudinal axis between the exhaust pipe and the fuel tank, the shield body having a generally concave surface extending from the axis to first and second vertical walls along first and second edges of the shield body, a forward attachment portion for attaching the shield body to the frame longitudinally forward of the fuel tank, a rearward attachment portion for attaching the shield body to the frame longitudinally rearward of the fuel tank, and a water escape port in the first vertical wall.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
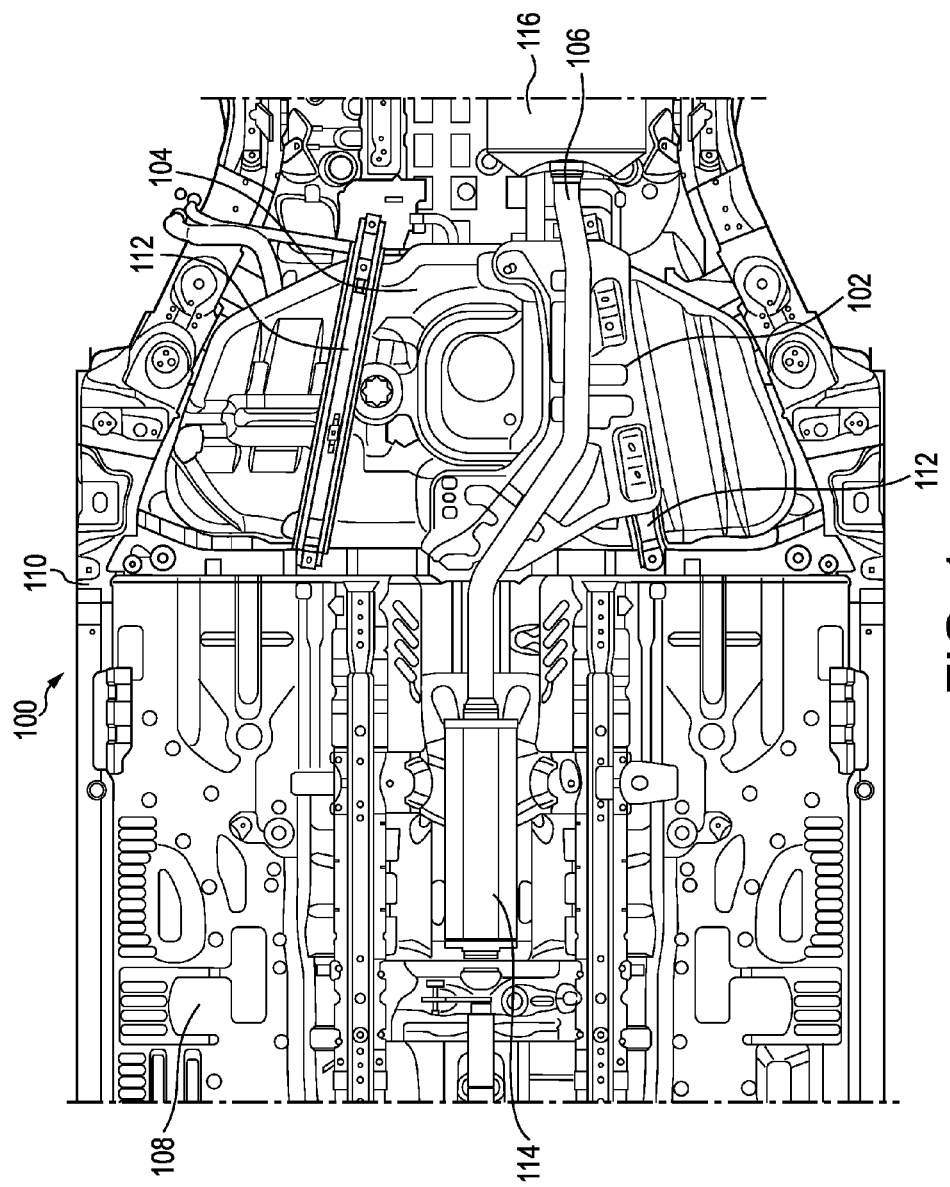
FIG. 1 is bottom view of a prior art motor vehicle.
Figure 2:
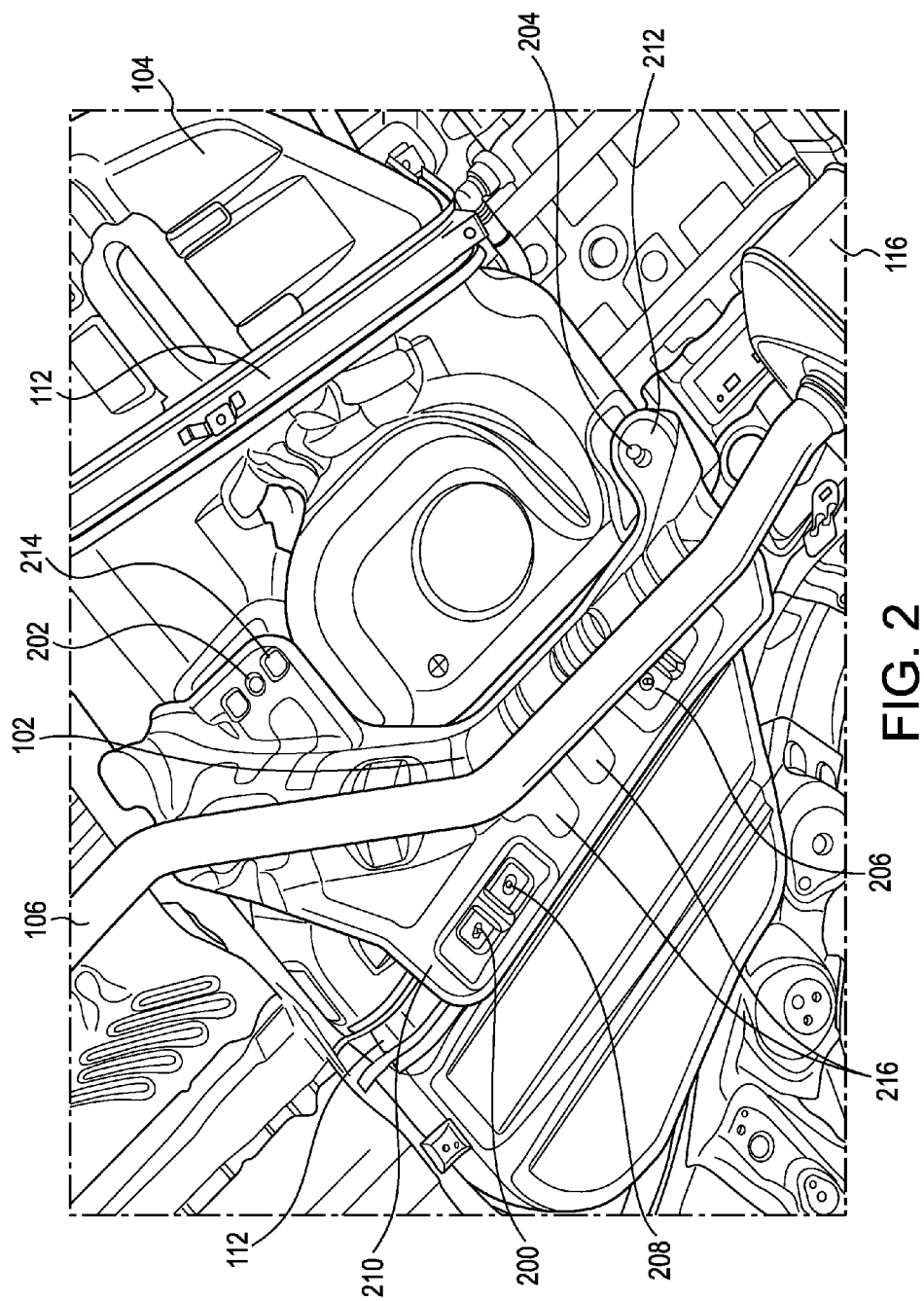
FIG. 2 is a bottom perspective view of the prior art motor vehicle.

FIGS. 1-2 illustrate a prior art heat shield 102 used to shield the fuel tank 104 of a motor vehicle 100 from the exhaust pipe 106. FIG. 1 is a bottom view of a portion of the motor vehicle 100, showing the floor 108 affixed to a frame 110, a fuel tank 104 attached to the frame 110 by, amongst other connectors not shown, tank bands 112, and a vehicle exhaust pipe 106. The exhaust pipe 106 stretches beneath the fuel tank 104 between the exhaust chamber 114 and the exhaust silencer 116. In order to protect the fuel tank 104 from the heat of the exhaust pipe 106, a heat shield 102 is mounted to the fuel tank 104 and acts as a barrier between the exhaust pipe 106 and the fuel tank 104.

The bottom of the motor vehicle 100, including the exhaust pipe 106, heat shield 102, and fuel tank 104, are exposed to water when the motor vehicle 100 is driven during rain, snow, or otherwise exposed to wet conditions. In order to prevent deformation of the heat shield 102 from water shock impact, which may be caused by splashed water hitting under floor 108 parts with a force great enough to deform the part and water damming, the heat shield 102 illustrated in FIG. 2 has five (5) separate mounting points 200, 202, 204, 206, 208. Additionally, in order to support the mounting points 200, 202, 204, 206, 208, the heat shield 102 includes portions of extra material 210, 212, 214 that are strictly for mounting and without any shielding function. Additional ribs 216 may also be necessary to increase stiffness of the heat shield 102 to prevent water shock impact deformation, which introduces complexity into the heat stamping process due to the complex shape of the heat shield 102. The heat shield 102 illustrated in FIG. 2 is larger than necessary, heavier than necessary, more expensive than necessary, and difficult to manufacture.

Figure 3:
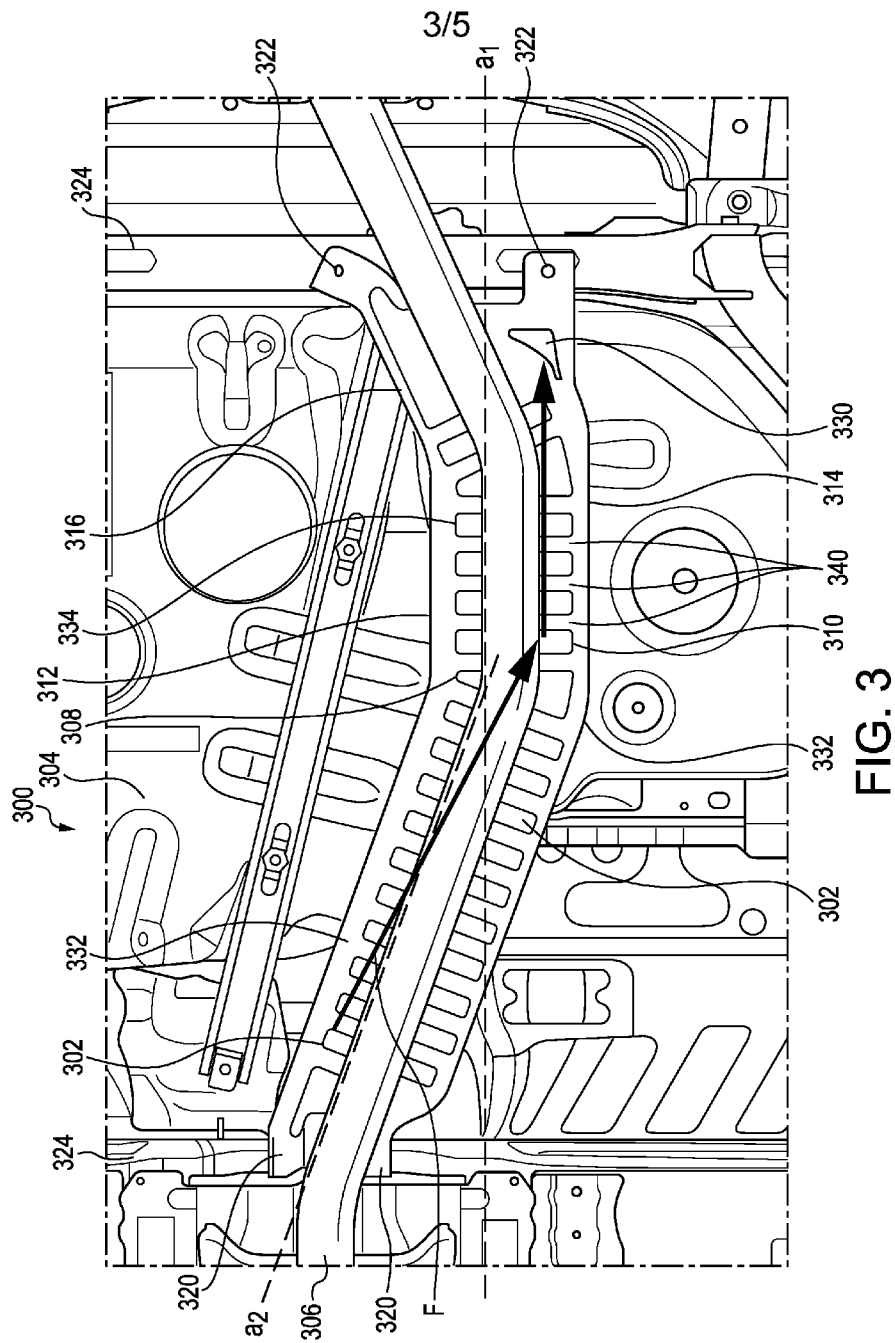
FIG. 3 is a bottom view of an embodiment a motor vehicle.
Figure 4:
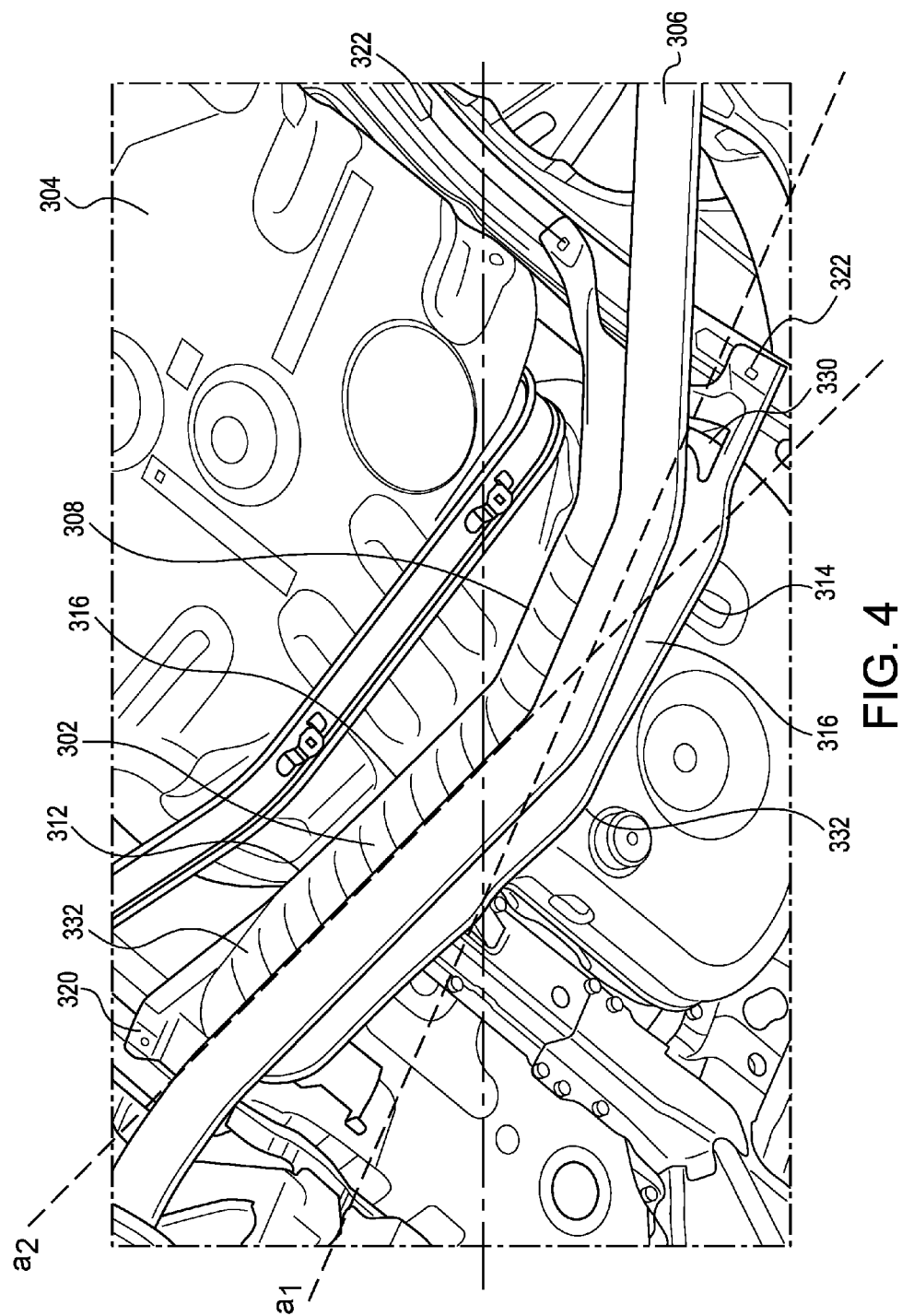
FIG. 4 is a bottom perspective view of the embodiment of the motor vehicle.
Figure 5:
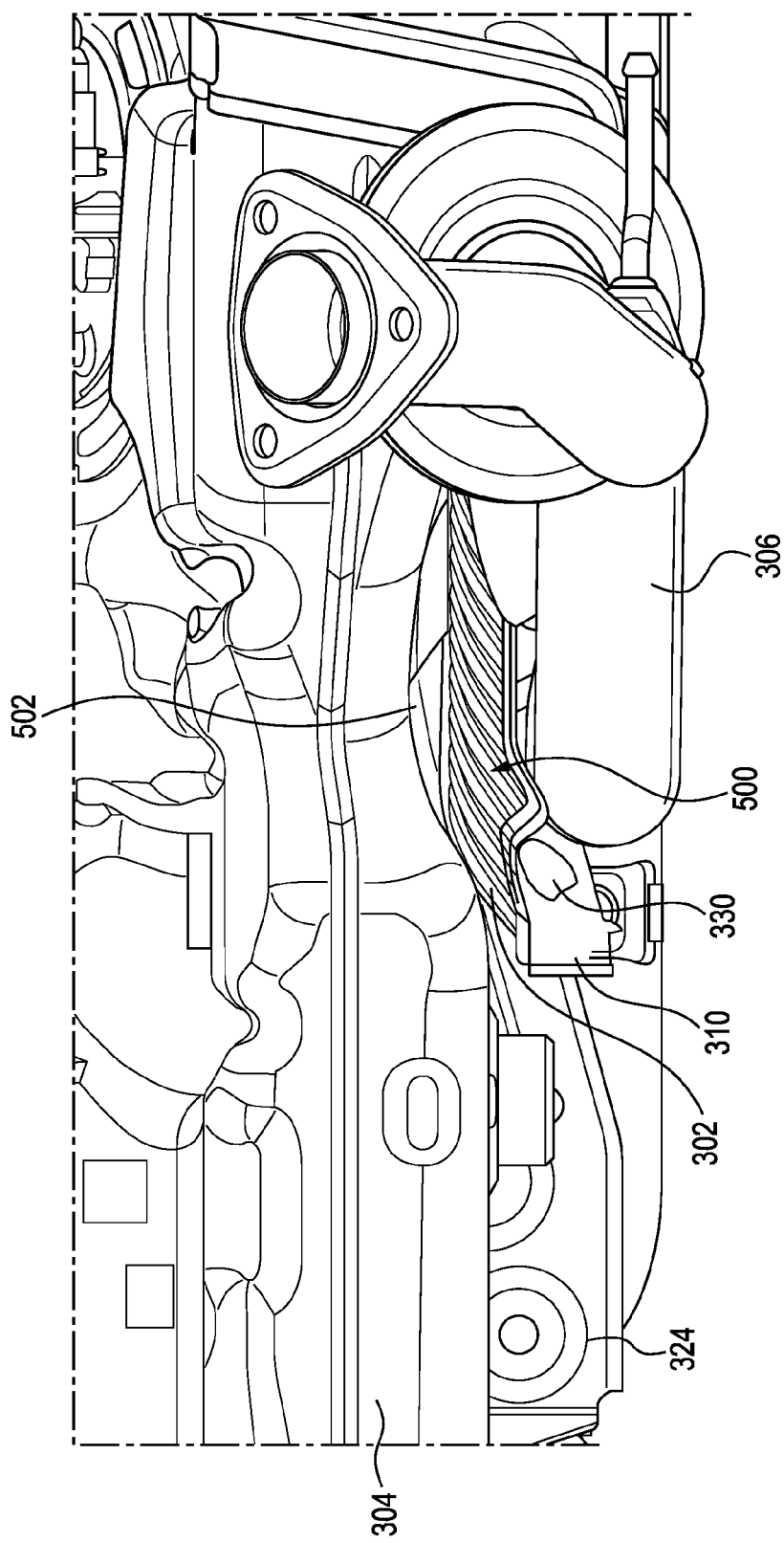
FIG. 5 is a front view of the embodiment of the motor vehicle.

FIGS. 3-5 illustrate an alternate embodiment of a heat shield 302 that improves on the drawbacks of the heat shield 102 illustrated in FIGS. 1-2. As with the prior heat shield 102 illustrated in FIGS. 1-2, the heat shield 302 illustrated in FIGS. 3-5 shields the fuel tank 304 from the exhaust pipe 306.

The heat shield 302 includes an elongated planar shield body that separates the exhaust pipe 306 and fuel tank 304 of a motor vehicle 300. The shield body 308 extends generally longitudinally along an axis $a_1$ of the motor vehicle 300, although it has a slight lateral bend 332 or turn to match the engineered pathway of the exhaust pipe 306. The shield body 308 has a generally concave shape 500 extending along the axis $a_1$ to first and second vertical walls 310, 312 along first and second edges 314, 316 of the shield body 308.

The heat shield 302 has a forward attachment portion 320 for attaching the shield body 308 to the frame 324 of the motor vehicle 300 longitudinally forward of the fuel tank 304. The heat shield also includes a rearward attachment portion 322 for attaching the shield body 308 to the frame 324 of the motor vehicle 300 longitudinally rearward of the fuel tank 304. The forward and rearward attachment portions 320, 322 are natural extensions of the shield body 308 and minimize the need to for extra material included with the heat shield 302, thereby minimizing the weight of the heat shield 302. Attachment of the heat shield 302 to the frame 324 is made by methods known to those skilled in the art, including, but not limited to, tapping screws, rivets, welds, or any other appropriate connector or connecting method.

In order to prevent water shock impact when the motor vehicle 300 drives through a puddle or standing water, or in generally wet weather conditions, a water escape port 330 is located in the first vertical wall 310. The concave shape 500 of the shield body 308 allows water to flow unencumbered, with water flow depicted in FIG. 3 by arrow F, to the rear of the heat shield 302. The bend 332 in the shield body 308 is such that a forward portion 332 of the shield body 308 extends along an axis $a_2$ that is slightly askew of longitudinal axis $a_1$. The rearward portion 334 of the shield body 308 extends along longitudinal axis $a_1$. The bend 332 also directs the flow of water toward the water escape port 330. Once water reaches the water escape port 330, the water quickly exits through the water escape port 330, thereby limiting damming or stresses that damage the shield body 308.

The heat shield body 308 may include ribs 340 to provide structural support for the heat shield 302. Due to the simplified shape of the heat shield 302, the ribs 340 are easier to stamp or form in the shield body 308.

The fuel tank 304, the exhaust pipe 306, and the heat shield 302 are engineered together so that the shape of the heat shield 302 tracks the shape of the exhaust pipe 306. Additionally, the shape of the fuel tank 304 may include an indentation 502 for receiving the heat shield 302, thereby creating tight packaging that efficiently uses the available space.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A heat shield for a motor vehicle, comprising:
   an elongated planar shield body for separating an exhaust pipe and a fuel tank of the motor vehicle, the shield body extending longitudinally along a longitudinal axis between the exhaust pipe and the fuel tank, the shield body having a generally concave surface extending from the axis to first and second vertical walls along first and second edges of the shield body;
   a forward attachment portion for attaching the shield body to a frame of the motor vehicle longitudinally forward of the fuel tank;
   a rearward attachment portion for attaching the shield body to the frame of the motor vehicle longitudinally rearward of the fuel tank; and
   a water escape port in the first vertical wall.

2. The heat shield of claim 1 wherein the water escape port is proximal to the rearward attachment portion.

3. The heat shield of claim 2 wherein the shield body comprises:
   a lateral bend;
   wherein a forward portion of the shield body extends along an axis that intersects the longitudinal axis at the lateral bend; and
   wherein a rearward portion of the shield body extends along the longitudinal axis.

4. The heat shield of claim 3 wherein the shield body further comprises:
   a plurality of laterally extending support ribs longitudinally spaced about the axis.

5. A motor vehicle comprising:
   a frame,
   a fuel tank attached to the frame by at least one tank band;
   an exhaust chamber attached to the frame;
   an exhaust silencer attached to the frame;
   an exhaust pipe extending between the exhaust chamber and the exhaust silencer;
   a heat shield located between the exhaust pipe and the fuel tank, the heat shield further comprising:
      an elongated planar shield body for separating an exhaust pipe and the fuel tank, the shield body extending longitudinally along a longitudinal axis between the exhaust pipe and the fuel tank, the shield body having a generally concave surface extending from the axis to first and second vertical walls along first and second edges of the shield body;
      a forward attachment portion for attaching the shield body to the frame longitudinally forward of the fuel tank;
      a rearward attachment portion for attaching the shield body to the frame longitudinally rearward of the fuel tank; and
      a water escape port in the first vertical wall.

6. The heat shield of claim 5 wherein the water escape port is proximal to the rearward attachment portion.

7. The heat shield of claim 6 wherein the shield body comprises:
   a lateral bend;
   wherein a forward portion of the shield body extends along an axis that intersects the longitudinal axis at the lateral bend; and wherein a rearward portion of the shield body extends along the longitudinal axis.

8. The heat shield of claim 7 wherein the shield body further comprises:

a plurality of laterally extending support ribs longitudinally spaced about the axis.

\* \* \* \* \*